United States Patent
Yamamoto et al.

(10) Patent No.: US 9,278,499 B2
(45) Date of Patent: Mar. 8, 2016

(54) VEHICLE INTERIOR MEMBER

(71) Applicant: MEIWA INDUSTRY CO., LTD., Atsugi-shi, Kanagawa (JP)

(72) Inventors: Satoru Yamamoto, Minokamo (JP); Takashi Kobayashi, Minokamo (JP)

(73) Assignee: MEIWA INDUSTRY CO., LTD., Atsugi-shi (JP)

( * ) Notice: Subject to any disclaimer, the term of this patent is extended or adjusted under 35 U.S.C. 154(b) by 12 days.

(21) Appl. No.: 14/477,975

(22) Filed: Sep. 5, 2014

(65) Prior Publication Data

US 2015/0099089 A1 Apr. 9, 2015

(30) Foreign Application Priority Data

Oct. 4, 2013 (JP) ................. 2013-208919

(51) Int. Cl.
*B32B 3/04* (2006.01)
*B32B 3/30* (2006.01)
*B32B 27/08* (2006.01)

(52) U.S. Cl.
CPC . *B32B 3/30* (2013.01); *B32B 27/08* (2013.01); *B32B 2250/03* (2013.01); *B32B 2250/24* (2013.01); *B32B 2605/003* (2013.01); *B32B 2605/08* (2013.01)

(58) Field of Classification Search
CPC ............... Y10T 428/24215; Y10T 428/24231; B32B 3/04; B60N 3/048
USPC .................................................. 428/124, 126
See application file for complete search history.

(56) References Cited

FOREIGN PATENT DOCUMENTS

JP 2005-153210 A 6/2005

*Primary Examiner* — Alexander Thomas
(74) *Attorney, Agent, or Firm* — Marvin A. Motsenbocker; DC Patent Lawyers, PLLC

(57) ABSTRACT

A deck board includes a main body member provided with recesses and protrusions, a top base material joined to a top side of the main body member, and a bottom base material joined to a back side of the main body member. A peripheral end of the bottom base material includes a folded portion, and a peripheral end of the top base material includes a folded portion. The folded portion of the bottom base material and the folded portion of the top base material are crushed and integrated into a tip joint, and the tip joint is joined to a side wall of the bottom base material.

4 Claims, 5 Drawing Sheets

VEHICLE INTERIOR MEMBER

BACKGROUND OF THE INVENTION

1. Field of the Invention

The present invention relates to a vehicle interior member.

2. Description of the Related Art

A vehicle interior member such as a deck board located in a trunk room of an automobile to cover up a floor opening has heretofore been publicly known (see Japanese Patent Application Publication No. 2005-153210).

SUMMARY OF THE INVENTION

In the peripheral area of a deck board described in Japanese Patent Application Publication No. 2005-153210, a top base material is curved at a peripheral corner to a back side; and the peripheral end of the top base material extends to the vicinity of a bottom base material on a back side.

However, in the deck board according to Japanese Patent Application Publication No. 2005-153210, a sharp edge of the peripheral end of the top base material is located in the vicinity of the bottom base material on the back side. Accordingly, when a driver grasps the peripheral area of the deck board, the driver may feel discomfort in the fingers as the fingers touch the end edge of the peripheral end of the top base material.

In view of the above, it is an object of the present invention to provide a vehicle interior member, which reduces feeling of discomfort in the fingers when a driver grasps a peripheral area of the vehicle interior member.

A vehicle interior member according to the present invention includes: a main body member including multiple recesses and multiple protrusions, and made of a synthetic resin; a top base material joined to a top side of the main body member, and made of a synthetic resin formed into a plate shape; and a bottom base material joined to a back side of the main body member, and made of a synthetic resin formed into a plate shape. A peripheral end of the bottom base material includes: a peripheral corner formed in a curved manner; a side wall extending from the peripheral corner to a top side; and a folded portion folded back at and extending from a tip of the side wall. A peripheral end of the top base material includes: a peripheral corner formed in a curved manner; and a folded portion folded back at and extending from a tip of the peripheral corner. The folded portion of the bottom base material and the folded portion of the top base material are crushed and integrated into a tip joint, and the tip joint is joined to the side wall of the bottom base material.

DESCRIPTION OF THE EMBODIMENTS

An embodiment of the present invention will be described below in detail with reference to the drawings.

(Configuration of Vehicle Interior Member)

Figure 1:
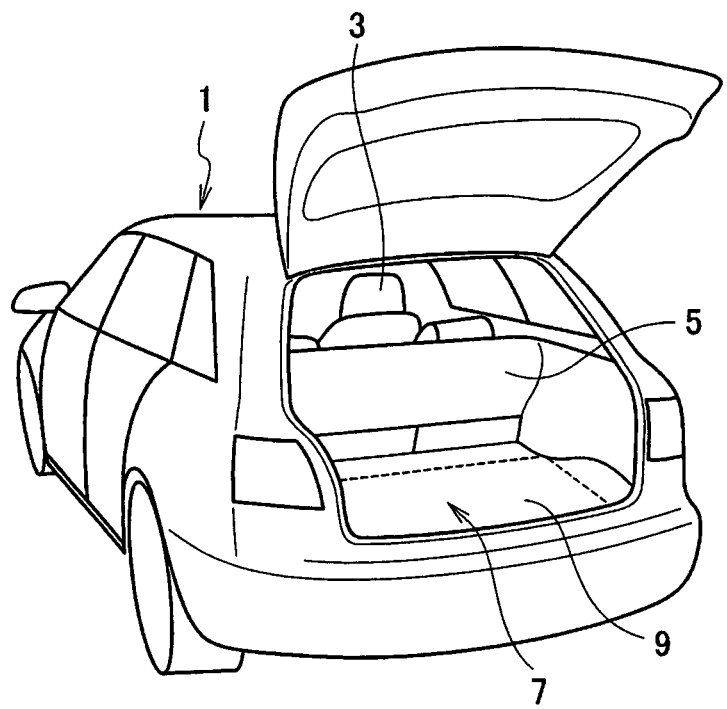
FIG. 1 is a perspective view of a vehicle in which a deck board according to an embodiment of the present invention is installed, which is viewed obliquely from behind.
Figure 2:
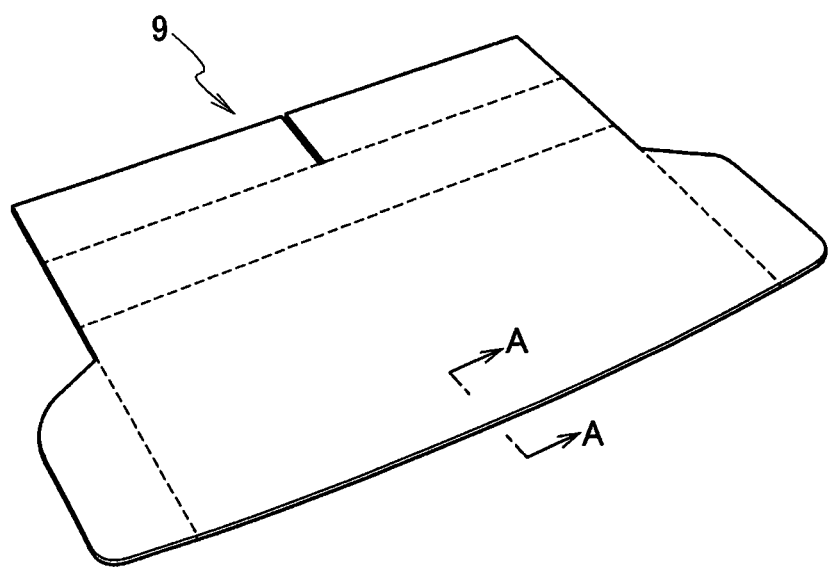
FIG. 2 is a perspective view showing the deck board of FIG. 1.

As shown in FIG. 1, front seats 3 and a rear seat 5 are located inside a vehicle compartment of a vehicle 1 of this embodiment, and a trunk room 7 is located behind the rear seat 5. A container recess (not shown) to contain a spare tire, tools, and the like is provided in a bottom surface of the trunk room 7. An upper opening of the container recess is covered with a deck board 9 (a vehicle interior member). As shown in FIG. 2, the deck board 9 is shaped substantially into a rectangle in plan view and is formed into a plate member made of a synthetic resin as described later.

Figure 3:
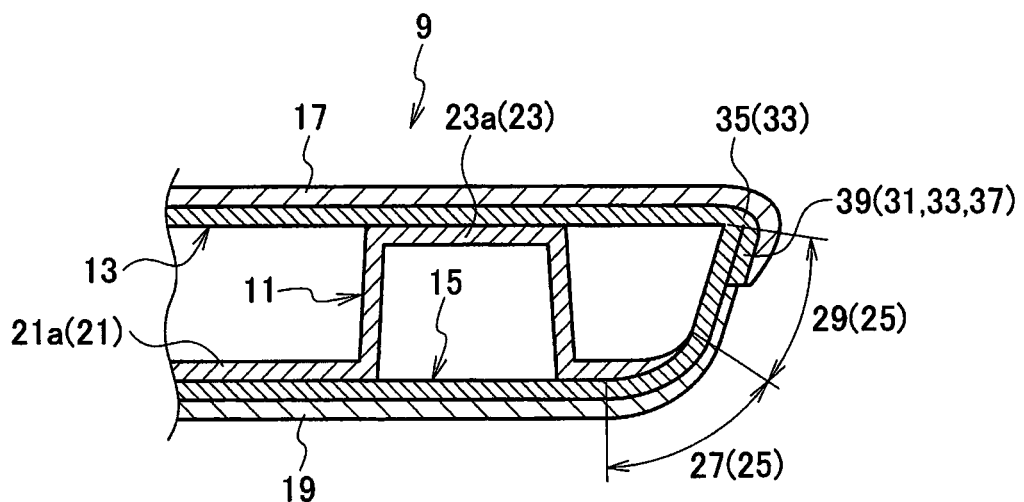
FIG. 3 is an enlarged cross-sectional view of the deck board taken along the A-A line in FIG. 2.

As shown in FIG. 3, the deck board 9 of the embodiment includes a main body member 11, a top base material 13, a bottom base material 15, and cover materials 17 and 19.

The main body member 11 is provided with recesses 21 and protrusions 23, and is made of a synthetic resin. Each protrusion 23 of the main body member 11 is formed to have a rectangular cross section, and protrudes upward. A top 23a of each protrusion 23 is joined to the top base material 13. Meanwhile, each recess 21 of the main body member 11 is formed to have a rectangular cross section, and recesses downward. A bottom 21a of each recess 21 is joined to the bottom base material 15.

The bottom base material 15 is joined to a back side of the main body member 11, and is made of a synthetic resin formed into a plate shape. A peripheral end 25 of the bottom base material 15 includes a peripheral corner 27 formed in a curved manner, a side wall 29 which extends obliquely upward from the peripheral corner 27 to the top side, and a folded portion 31 which is folded back at and extends from a tip of the side wall 29.

The top base material 13 is joined to a top side of the main body member 11, and is made of a synthetic resin formed into a plate shape. A peripheral end 33 of the top base material 13 includes a peripheral corner 35 formed in a curved manner, and a folded portion 37 which is folded back at a tip of the peripheral corner 35.

The folded portion 31 of the bottom base material 15 and the folded portion 37 of the top base material 13 are crushed and integrated into a tip joint 39. The tip joint 39 is joined to the side wall 29 of the bottom base material 15.

The cover materials 17 and 19 are attached to the top base material 13 and the bottom base material 15, respectively, by thermal welding or by use of an adhesive.

Figure 4:
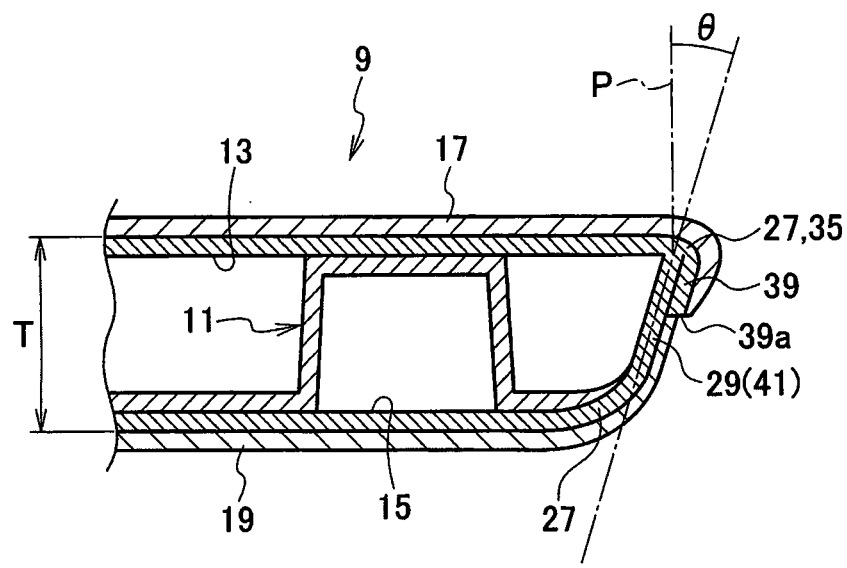
FIG. 4 is an enlarged cross-sectional view of the deck board taken along the A-A line in FIG. 2, which indicates dimensions of regions therein.

As shown in FIG. 4, the side wall 29 of the bottom base material 15 is formed into an inclined surface 41 extending obliquely to an orthogonal plane P that is orthogonal to the top base member 13. An intersection angle θ between the inclined surface 41 and the orthogonal plane P is preferably in a range from 10° to 30°.

Moreover, the peripheral corner 35 of the top base material 13 is formed in a curved manner with a first curvature radius (not shown) while the peripheral corner 27 of the bottom base material 15 is formed in a curved manner with a second curvature radius (not shown). Here, the second curvature radius is set larger than the first curvature radius.

In addition, a height position of an end edge 39a of the tip joint 39 is set to about ⅓ of a thickness of the main body member 11. Specifically, a length of the tip joint 39 from the peripheral corners 27 and 35 to the end edge 39a is set to about ⅓ of the thickness T of the main body member 11.

(Materials of Vehicle Interior Member)

The following synthetic resins, for example, are preferably used as materials of the top base material 13, the main body member 11, and the bottom base material 15. The applicable synthetic resins include: polyolefin-based resins such as low-density polyethylene, high-density polyethylene, liner low-density polyethylene, homopolymer polypropylene, random copolymer polypropylene, block copolymer polypropylene; copolymers obtained by using two or more monomers of the polyolefin-based resins as comonomers; and copolymers obtained by using one monomer of the polyolefin-based resins and a different monomer as comonomers. The applicable synthetic resins further include: any of polyvinyl chloride, chlorinated polyvinyl chloride, ABS, AAS, AES, polystyrene, polyethylene terephthalate, polycarbonate, polyamide, polyvinylidene fluoride, polyphenylene sulfide, polysulfone, and polyether ketone; copolymers obtained by using two or more monomers of the foregoing resins as comonomers; and copolymers obtained by using one monomer of the foregoing resins and a different monomer as comonomers. These materials may be used alone or in combination. Although various thermoplastic resins are applicable as cited above, a polypropylene-type resin is preferred in consideration of balance in characteristics of cost factors, formability, physical properties, low-temperature resistance, heat resistance, and the like. Here, filler may be blended as an auxiliary material in order to enhance rigidity of the vehicle interior member. Although such an auxiliary material is not particularly limited, talc, calcium carbonate or the like is preferred in consideration of balance in characteristics of cost factors, formability, ease in handling, and the like. An increase in an amount of the filler to be added leads to an increase in costs or an increase in specific gravity. In consideration of the balance thereof, it is therefore preferable to set the amount of the filler to be added in a range from 5 to 30 percent by mass in the case of talc, or equal to or below 20 percent by mass in the case of calcium carbonate. In addition to the filler, any of an antioxidant, an ultraviolet absorber, an antistatic agent, an antimicrobial agent, a flame retarder, a light stabilizer, a lubricant, and the like may be added as appropriate. In the meantime, a product thickness of the vehicle interior member is preferably in a range from 3 to 10 mm, for example.

Meanwhile, a cover such as a non-woven fabric, a napped fabric, an artificial leather sheet, and a synthetic resin film may be used for the cover materials 17 and 19. Alternatively, a cover material prepared by lining any of the aforementioned covers with a cushion material may be used for the cover materials 17 and 19. It is particularly preferable to use any of: a general non-woven fabric; and a needle-punched non-woven fabric having a weight in a range from 20 to 500 g/m² and made of either polyester fibers alone or mixed fibers of polyester fibers mixed with 0 to 20 percent by mass of polypropylene fibers.

(Method of Forming Terminal of Vehicle Interior Member)

A terminal of the vehicle interior member of the embodiment of the present invention may be processed by the following method, for example.

Figure 5:
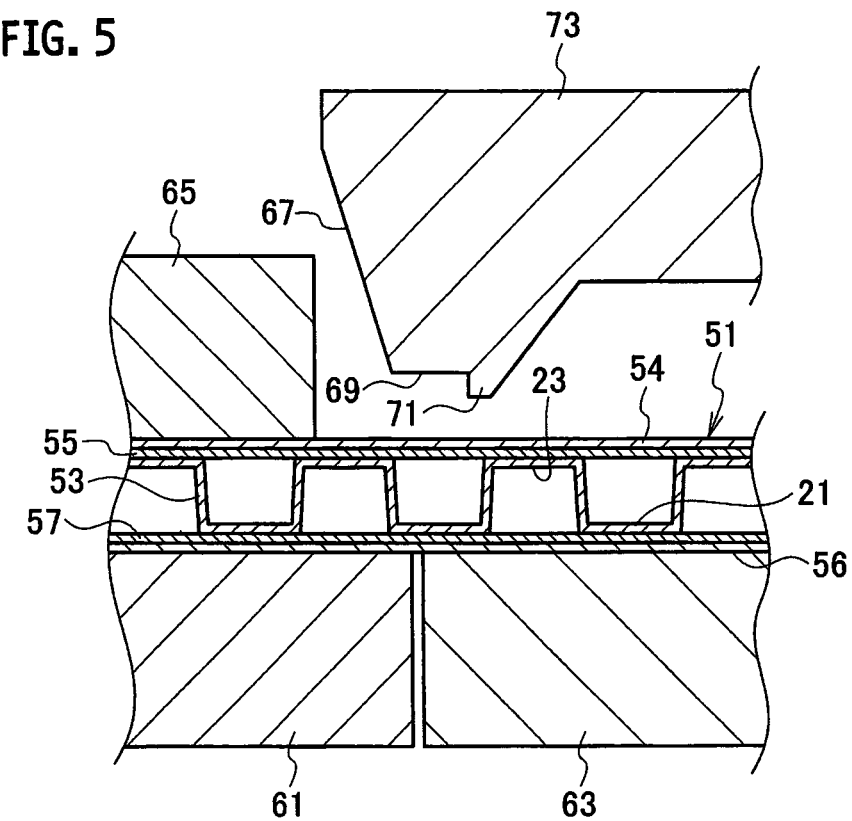
FIG. 5 is a cross-sectional view showing a manufacturing process for the deck board according to the embodiment of the present invention, which illustrates a state of sandwiching a vehicle interior member material between an upper pad and a lower pad from above and below.

First, a vehicle interior member material 51 is prepared as shown in FIG. 5. The vehicle interior member material 51 is formed by: joining a material 57 for the top base material which is formed into a plate shape and made of a synthetic resin to a lower side of a main body member material 53 which is provided with the recesses 21 and the protrusions 23 and made of a synthetic resin; and joining a material 55 for the bottom base material which is formed into a plate shape and made of a synthetic resin to an upper side of the main body member material 53. Cover materials 54 and 56 are also joined thereto.

Then, the vehicle interior member material 51 is placed on a lower pad 61 and on a vertical slider 63 located beside the lower pad 61. Thereafter, the vehicle interior member material 51 is sandwiched between an upper pad 65 located above the lower pad 61 and the lower pad 61 from above and below.

Next, a heating block 73 is located above the vertical slider 63. The heating block 73 includes: an inclined portion 67 inclined so as to further recede from the upper pad 65 while extending downward; a bottom 69 extending in a lateral direction from a lower end of the inclined portion 67; and a cutting blade 71 provided at an end of the bottom 69 and projecting downward.

Figure 6:
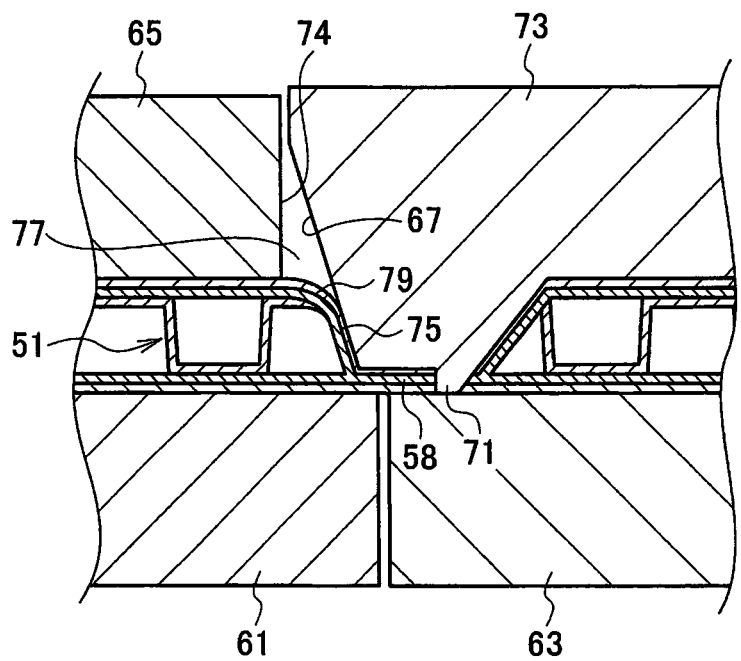
FIG. 6 is another cross-sectional view showing the manufacturing process for the deck board according to the embodiment of the present invention, which illustrates a state of forming a crushed portion at an end of the vehicle interior member material by bringing a heating block down to a bottom end position and thus crushing the vehicle interior member material in a thickness direction.

Moreover, as shown in FIG. 6, the heating block 73 is brought down whereby the vehicle interior member material 51 is crushed in its thickness direction to form a tip joint 58 at an end of the vehicle interior member material 51, and the tip joint 58 is cut off by the cutting blade 71. At the same time, a side wall 75 of the vehicle interior member material 51 is press-formed with the inclined portion 67 of the heating block 73. Here, a space 77 formed between the inclined portion 67 of the heating block 73 and a side wall 74 of the upper pad 65 is located to face a peripheral corner 79 on a back side of the vehicle interior member material 51.

Figure 7:
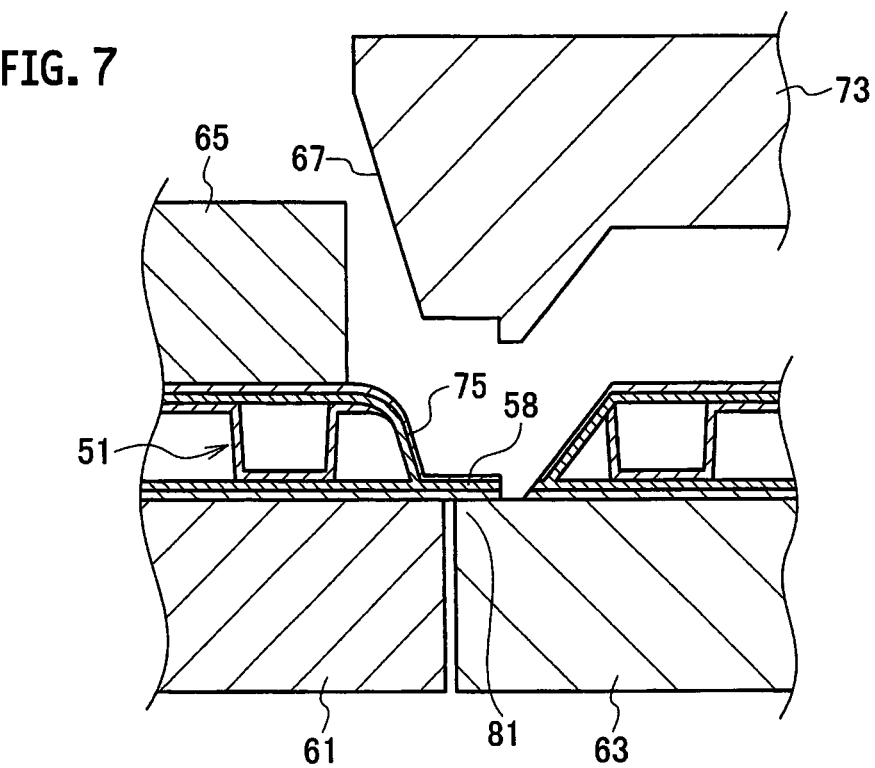
FIG. 7 is another cross-sectional view showing the manufacturing process for the deck board according to the embodiment of the present invention, which illustrates a state after lifting up the heating block.
Figure 8:
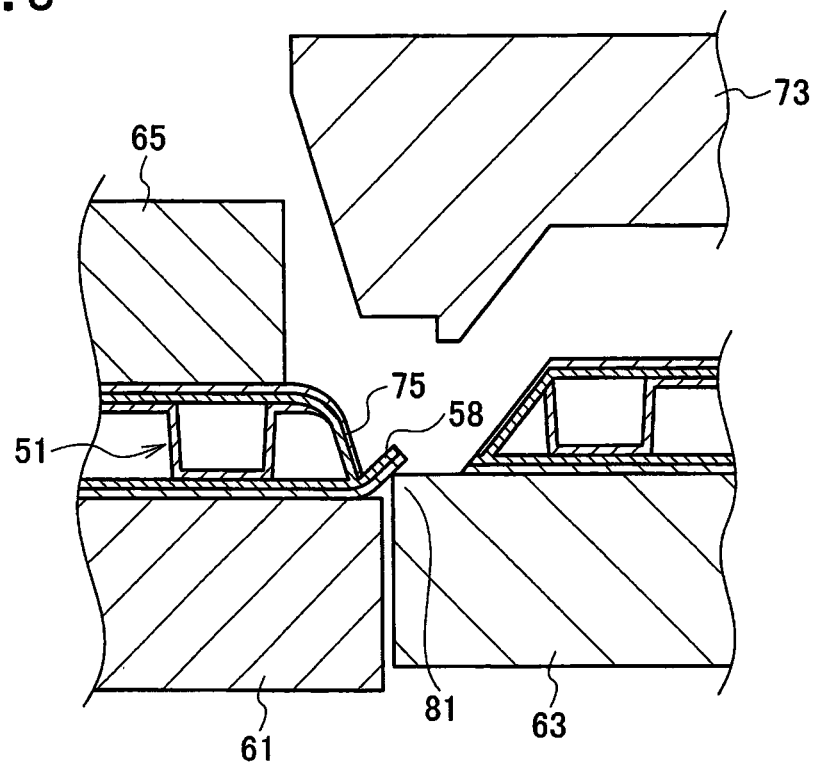
FIG. 8 is another cross-sectional view showing the manufacturing process for the deck board according to the embodiment of the present invention, which illustrates a state of bending the crushed portion of the vehicle interior member material by lifting up a vertical slider.
Figure 9:
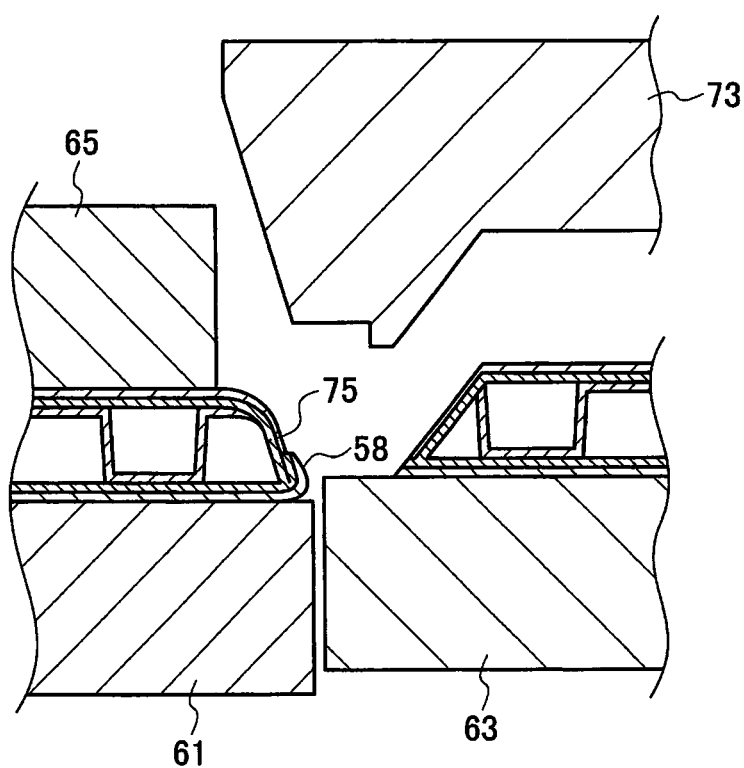
FIG. 9 is the other cross-sectional view showing the manufacturing process for the deck board according to the embodiment of the present invention, which illustrates a state of joining the crushed portion of the vehicle interior member material to a side wall by lifting up the vertical slider.

Furthermore, the heating block 73 is lifted up as shown in FIG. 7. Then, the vertical slider 63 is lifted up as shown in FIG. 8. Thus, the tip joint 58 of the vehicle interior member material 51 is folded by using an upper end corner 81 of the vertical slider 63, and the tip joint 58 is joined to the side wall 75 as shown in FIG. 9.

Next, operation and effects of the embodiment will be described.

(1) The deck board 9 (the vehicle interior member) of the embodiment includes: the main body member 11 provided with the recesses 21 and the protrusions 23 and made of the synthetic resin; the top base material 13 joined to the top side of the main body member 11 and made of the synthetic resin formed into the plate shape; and the bottom base material 15 joined to the back side of the main body member 11 and made of the synthetic resin formed into the plate shape. The peripheral end 25 of the bottom base material 15 includes the peripheral corner 27 formed in a curved manner, the side wall 29 extending from the peripheral corner 27 to the top side, and the folded portion 31 folded back at and extending from the tip of the side wall 29. The peripheral end 33 of the top base material 13 includes the peripheral corner 35 formed in a curved manner, and the folded portion 37 folded back at and extending from the tip of the peripheral corner 35. The folded portion 31 of the bottom base material 15 and the folded portion 37 of the top base material 13 are crushed and integrated into the tip joint 39. The tip joint 39 is joined to the side wall 29 of the bottom base material 15.

The peripheral corner 27 at the peripheral end 25 of the bottom base material 15 is formed in a curved manner. Accordingly, when the deck board 9 is grasped, the fingers support the peripheral corner 27 on the back side. Feeling of discomfort in the fingers can thus be reduced.

(2) The side wall 29 of the bottom base material 15 is formed into the inclined surface 41 extending obliquely to the orthogonal plane P that is orthogonal to the top base member 13. The intersection angle θ between the inclined surface 41 and the orthogonal plane P is set in the range from 10° to 30°.

When the intersection angle is below 10°, the side wall 29 is nearly perpendicular whereby the peripheral corner 27 of the bottom base material 15 is formed into a pointed shape with a smaller curvature radius. This increases the feeling of discomfort in the fingers when the deck board 9 is grasped.

On the other hand, when the intersection angle exceeds 30°, it is difficult to join the tip joint 39 to the side wall 29.

(3) The curvature radius of the peripheral corner 27 of the bottom base material 15 is larger than the curvature radius of the peripheral corner 35 of the top base material 13.

The fingers touch the peripheral corner 27 of the bottom base material 15 when the deck board 9 is grasped. The feeling of discomfort in the fingers can be reduced since the curvature radius of the peripheral corner 27 of the bottom base material 15 is larger than the curvature radius of the peripheral corner 35 of the top base material 13.

(4) The method of forming the terminal of the deck board 9 (the vehicle interior member) of the embodiment includes the steps of: preparing the vehicle interior member material 51 formed by joining the material 55 for the bottom base material, which is formed into the plate shape and made of the synthetic resin, to the upper side of the main body member material 53, which is provided with the recesses 21 and the protrusions 23 and is made of the synthetic resin, and joining the material 57 for the top base material, which is formed into the plate shape and made of the synthetic resin, to the lower side of the main body member material 53; placing the vehicle interior member material 51 on the lower pad 61 and on the vertical slider 63 located beside the lower pad 61, and sandwiching the vehicle interior member material 51 between the upper pad 65 located above the lower pad 61 and the lower pad 61 from above and below; locating the heating block 73 above the vertical slider 63, the heating block 73 including the inclined portion 67 inclined in such a way that the side surface of the heating block 73 on the upper pad side further recedes from the upper pad 65 while extending downward, the bottom 69 extending in the lateral direction from the lower end of the inclined portion 67, and the cutting blade 71 provided at the bottom 69 and projecting downward; bringing down the heating block 73, thus crushing the vehicle interior member material 51 in the thickness direction and forming the tip joint 58 at the end of the vehicle interior member material 51, and causing the inclined portion 67 of the heating block 73 and the side surface 74 of the upper pad 65 to form the space 77 therebetween at a location facing the peripheral corner 79 on the back side of the vehicle interior member material 51 when the side wall 75 of the vehicle interior member material 51 is press-formed with the inclined portion 67 of the heating block 73; and lifting up the heating block 73 and then lifting up the vertical slider 63 to fold the tip joint 58 of the vehicle interior member material 51 and to join the tip joint 58 to the side wall 75.

The space 77 formed between the inclined portion 67 of the heating block 73 and the side wall 74 of the upper pad 65 is located to face the peripheral corner 79 on the back side of the vehicle interior member material 51. Thus, the peripheral corner 79 on the back side of the deck board 9 can be formed into the curved shape with the large curvature radius.

EXAMPLES

The present invention will be described below in further detail with reference to examples.

Specifically, as shown in Table 1 below, terminals of deck boards were formed by using vehicle interior member materials having a thickness of 5 mm and lengths of tip joints in a range from 0 mm to 5 mm. Results are shown in Table 1.

TABLE 1

| Length of Tip Joint (mm) | Folding Back of Tip Joint | Sensory Evaluation | Ratio (%) of Length of Tip Joint to Thickness (5 mm) of Deck Board | Curvature Radius (mm) of Peripheral Corner of Bottom Base Material |
|---|---|---|---|---|
| 0.00 | NG | x | 0 | 0 |
| 0.50 | NG | x | 10 | R4.50 |
| 1.00 | OK | ○ | 20 | R4.00 |
| 1.25 | OK | ○ | 25 | R3.75 |
| 1.50 | OK | ○ | 30 | R3.50 |
| 2.00 | OK | ○ | 40 | R3.00 |
| 2.50 | OK | ○ | 50 | R2.50 |
| 3.00 | OK | ○ | 60 | R2.00 |
| 3.50 | OK | x | 70 | R1.50 |
| 4.00 | OK | x | 80 | R1.00 |
| 4.50 | OK | x | 90 | R0.50 |
| 5.00 | OK | x | 100 | R0 |

As shown in Table 1, when the length of the tip joint was 0 mm (i.e., when the tip joint was not provided), it was not possible to perform the processing for bending the tip joint and joining the tip joint to the side wall. Meanwhile, when the deck board was lifted up, the feeling of discomfort in the fingers was observed since the peripheral corner on the back side of the deck board was pointed.

When the length of the tip joint was 0.5 mm, it was not possible to perform the processing for bending the tip joint and joining the tip joint to the side wall. Meanwhile, when the deck board was lifted up, the feeling of discomfort in the fingers was observed since the peripheral corner on the back side of the deck board was pointed.

When the length of the tip joint was in a range from 1.0 mm to 3.0 mm, it was possible to perform the processing for bending the tip joint and joining the tip joint to the side wall. Meanwhile, when the deck board was lifted up, the feeling of discomfort in the fingers was not observed since the peripheral corner on the back side of the deck board was gently curved.

When the length of the tip joint was in a range from 3.5 mm to 5.0 mm, it was possible to perform the processing for bending the tip joint and joining the tip joint to the side wall. Meanwhile, burr was caused at the tip joint. Accordingly, when the deck board was lifted up, the feeling of discomfort in the fingers was observed due to the burr.

The present invention is not limited only to the above-described embodiment but various modifications and changes are possible. For example, in the above-described embodiment, the height position of the end edge 39a of the tip joint 39 is located at a region of about ⅓ of the thickness of the main body member as shown in FIG. 4.

However, the height position of the end edge 39a of the tip joint 39 may be located at a central part in the thickness T of the main body member 11. When the height position of the end edge 39a of the tip joint 39 is located above the central part in the thickness T of the main body member 11, it is difficult to join the tip joint 39 efficiently to the side wall 29 since the tip joint 39 becomes too short. On the other hand, when the height position of the end edge 39a of the tip joint 39 is located below the central part in the thickness T of the main body member 11, it is difficult to join the tip joint 39 efficiently to the side wall 29 since the tip joint 39 becomes too long.

This application claims the benefit of priority from Japanese Patent Application No. 2013-208919, filed on Oct. 4, 2013, the entire contents of which are incorporated herein by reference.

The invention claimed is:

1. A vehicle interior member comprising:
 a main body member including a plurality of recesses and a plurality of protrusions, and made of a synthetic resin;
 a top base material joined to a top side of the main body member and made of a synthetic resin formed into a plate shape; and
 a bottom base material joined to a back side of the main body member and made of a synthetic resin formed into a plate shape, wherein
 a peripheral end of the bottom base material includes
  a peripheral corner formed in a curved manner,
  a side wall extending from the peripheral corner to a top side, and
  a folded portion folded back at and extending from a tip of the side wall,
 a peripheral end of the top base material includes
  a peripheral corner formed in a curved manner, and
  a folded portion folded back at and extending from a tip of the peripheral corner, and
 the folded portion of the bottom base material and the folded portion of the top base material are crushed and integrated into a tip joint, and the tip joint is joined to the side wall of the bottom base material.

2. The vehicle interior member according to claim 1, wherein a height position of an end edge of the tip joint is located at a central part in a thickness of the main body member.

3. The vehicle interior member according to claim 1, wherein
 the side wall of the bottom base material is formed into an inclined surface extending obliquely to an orthogonal plane orthogonal to the top base member, and
 an intersection angle between the inclined surface and the orthogonal plane is set in a range from 10° to 30°.

4. The vehicle interior member according to claim 1, wherein a curvature radius of the peripheral corner of the bottom base material is larger than a curvature radius of the peripheral corner of the top base material.

* * * * *